(12) United States Patent
van der Bijl et al.

(10) Patent No.: US 10,645,859 B2
(45) Date of Patent: May 12, 2020

(54) METHOD OF OPERATING AN AGRICULTURAL SYSTEM HAVING A TRACTOR AND AN IMPLEMENT, AND AN AGRICULTURAL SYSTEM

(71) Applicant: Kverneland Group Mechatronics B.V., Nieuw-Vennep (NL)

(72) Inventors: Martijn van der Bijl, Zonnemaire (NL); Peter van der Vlugt, Hoofddorp (NL)

(73) Assignee: Kverneland Group Mechatronics B.V., Nieuw-Vennep (NL)

( * ) Notice: Subject to any disclaimer, the term of this patent is extended or adjusted under 35 U.S.C. 154(b) by 143 days.

(21) Appl. No.: 16/075,223

(22) PCT Filed: Feb. 10, 2017

(86) PCT No.: PCT/EP2017/052981
§ 371 (c)(1),
(2) Date: Aug. 3, 2018

(87) PCT Pub. No.: WO2017/140585
PCT Pub. Date: Aug. 24, 2017

(65) Prior Publication Data
US 2019/0059200 A1 Feb. 28, 2019

(30) Foreign Application Priority Data

Feb. 19, 2016 (EP) .................................... 16156482

(51) Int. Cl.
*A01B 71/02* (2006.01)
*A01B 71/06* (2006.01)
*A01B 76/00* (2006.01)

(52) U.S. Cl.
CPC .............. *A01B 71/06* (2013.01); *A01B 71/02* (2013.01); *A01B 76/00* (2013.01)

(58) Field of Classification Search
CPC ......... A01B 76/00; A01B 71/02; A01B 71/06; A01D 69/00; A01D 89/002; A01F 21/00;
(Continued)

(56) References Cited

U.S. PATENT DOCUMENTS 6,105,353 A      8/2000  Mohr et al.
9,277,692 B2 *   3/2016  Roth .................... A01F 15/085
(Continued)

FOREIGN PATENT DOCUMENTS

GB    2486730 A       6/2012
WO    2014154790 A1   10/2014
WO    2017140585 A1   8/2017

OTHER PUBLICATIONS

Search Report pertaining to Application No. PCT/EP2017/052981 dated May 4, 2017.

*Primary Examiner* — Robert E Pezzuto
(74) *Attorney, Agent, or Firm* — Dinsmore & Shohl, LLP

(57) ABSTRACT

The present disclosure refers to an agricultural system having a tractor and an implement and a method of operating. A driveline is provided between a driving device (11.3) of a tractor (1) and a first functional element (12.3) of an implement (2), the driveline comprising a tractor driveline (14) and an implement driveline (17) connected through a power take-off connection (13). A driving force is provided to the first functional element (12.3) of the implement (2) through the driveline in a first mode of operation, thereby, a working tool (18) rotating in a first direction in response to the driving force. An operation problem is detected for the first functional element (12.3) by a sensor (19) provided in a tractor-implement control system. Reverse control signals are generated in a tractor controller (4) provided in the tractor-implement control system in response to the detecting of the operation problem for the first functional element (12.3). A direction of rotation of the drive output shaft (15) of the tractor power take-off (13) is reversed in response to the providing of the reverse control signals in the tractor controller (4) in a second mode of operation, thereby, rotating the working tool (18) of the first functional element (12.3) in a second direction which is opposite to the first direction.

14 Claims, 2 Drawing Sheets

Figure 1:
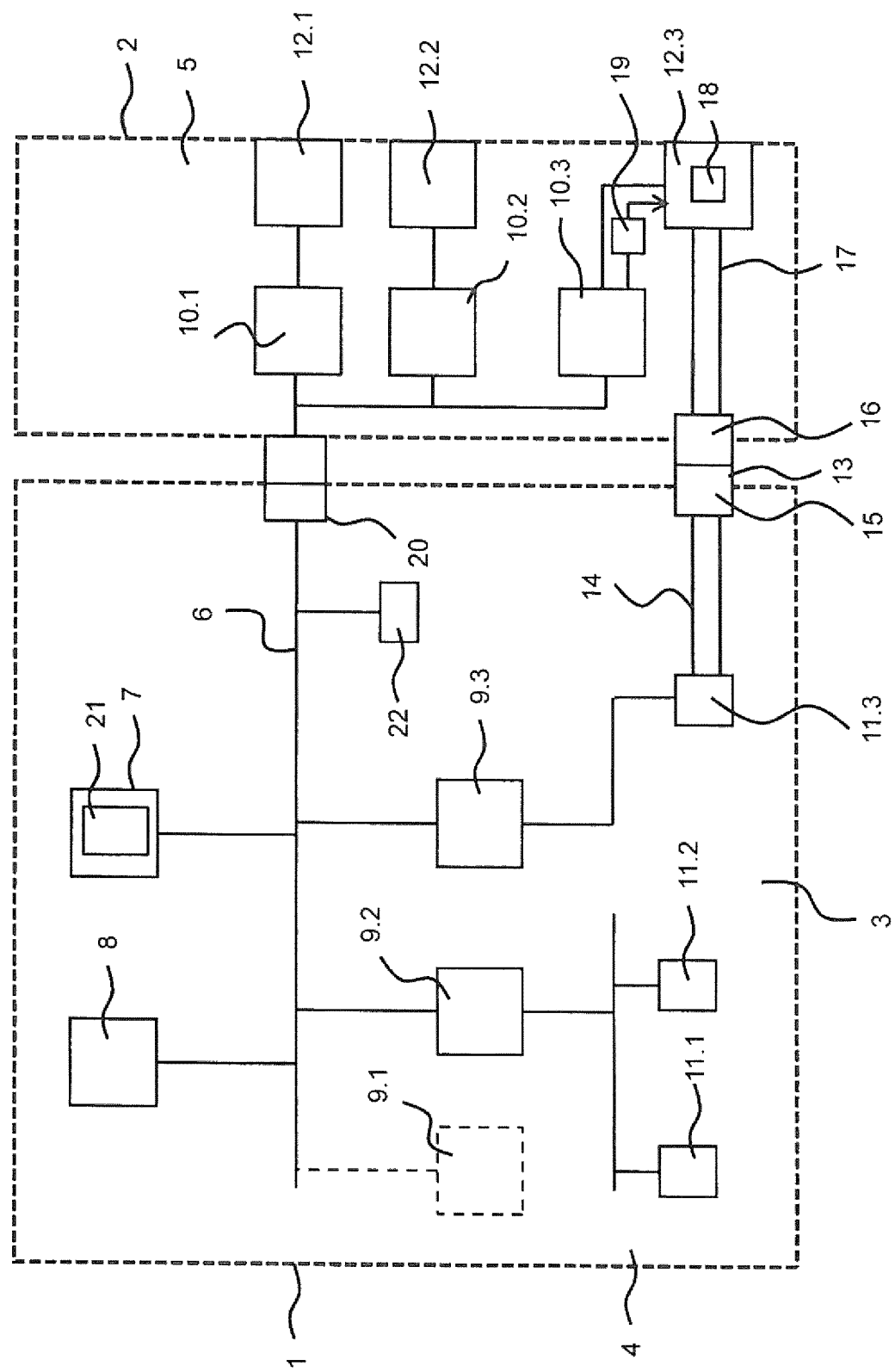

(58) Field of Classification Search
CPC .... A01F 15/085; A01F 15/04; A01F 15/0841; A01F 15/042; A01F 15/10
USPC ............. 172/1–11; 56/10.2 R, 341; 100/270, 100/280, 342
See application file for complete search history.

(56) References Cited

U.S. PATENT DOCUMENTS

| | | | |
|---|---|---|---|
| 9,402,346 B2* | 8/2016 | Bonte ................. | A01F 15/0841 |
| 10,178,833 B2* | 1/2019 | Bonte ................. | A01F 15/0841 |
| 10,383,284 B2* | 8/2019 | Benevelli ............ | A01F 15/0841 |
| 2003/0167939 A1* | 9/2003 | Roth ................... | A01F 15/0841 100/342 |
| 2016/0050850 A1* | 2/2016 | Bonte ................. | A01F 15/0841 56/10.7 |
| 2019/0059200 A1 | 2/2019 | van der Bijl et al. | |

* cited by examiner

METHOD OF OPERATING AN AGRICULTURAL SYSTEM HAVING A TRACTOR AND AN IMPLEMENT, AND AN AGRICULTURAL SYSTEM

The present disclosure refers to a method of operating an agricultural system having a tractor and an implement attached to the tractor, and an agricultural system.

BACKGROUND

An agricultural system may be provided with a tractor and an implement attached or connected to the tractor. A driveline of the agricultural system may comprise a tractor driveline provided with a driving unit or mechanism which may also be referred to as driving engine and which is connected to a power take-off to which an implement driveline is connected, thereby, establishing a driveline between the driving unit and one or more functional elements of the implement. By means of the driveline a driving force is transmitted to the one or more functional elements of the implement in operation of the agricultural system. In response to receiving the driving force, one or more working tool provided in the functional element may be driven. For example, the one or more working tool may be rotated around an axis in operation.

Increasingly, for agricultural machines electronic control of one or more functional elements of the agricultural machine is used. A common standard, namely ISO 11783, was proposed for providing a network infrastructure for transmitting data signals between the various devices that may compose an agricultural machine or system. In addition to the transmission of control or data signals, the network infrastructure may be used for providing power supply to the various devices connected to the network infrastructure, e.g. from a tractor power supply to functional or working elements of an implement connected to the tractor. While the control or data signals are transmitted over signal or data lines of the network structure which may also be referred to as communication lines, power supply may be applied over one or more power supply lines provided by the network infrastructure, such power supply line being established separately from the data lines used for a data or signal transmission.

With respect to the network infrastructure, a common data or control bus is provided to which different components of the agricultural system are connected. Through the data bus data which may also be referred to as signal bus can be exchanged between the components connected to the bus. Among the components there may be a user terminal, and a plurality of electronic control units (ECU) each of which is assigned to a functional or working element of the agricultural machine or system, e.g. an implement connected to a tractor. The electronic control unit provides control signals to the functional element assigned to the respective electronic control unit for operating the functional or working element. Such functional element may refer to an element of a tractor or a functional element of an implement. In conclusion, the network infrastructure may provide for data communication within a tractor or between the tractor and an implement connected to the tractor.

SUMMARY

It is an object to provide an agricultural system, and a method of operating an agricultural system having a tractor and an implement attached to the tractor for which the adjustment to differing operational needs is improved.

According to one aspect, a method of operating an agricultural system having a tractor and an implement attached to the tractor according to claim 1 is provided. Also, an agricultural system according to claim 14 provided. Alternative embodiments are disclosed in the dependent claims.

According to an aspect, a method of operating an agricultural system having a tractor and an implement is provided. The method comprises providing a driveline between a driving device of a tractor and a first functional element of in implement operatively attached to the tractor, the driveline comprising a tractor driveline and an implement driveline connected through a power take-off connection connecting a drive output shaft of a tractor power take-off provided in the tractor driveline and a drive input shaft of the implement driveline. A driving force is provided to the first functional element of the implement through the driveline in a first mode of operation. Thereby, a working tool rotatable received in the first functional implement is rotated in a first direction in response to the driving force. An operation problem is detected for the first functional element of the implement by a sensor provided in a tractor-implement control system configured to provide one or more control functions for both the tractor and the implement. In response to the detecting of the operation problem for the first functional element, reverse control signals are provided in a tractor controller provided in the tractor-implement control system. A direction of rotation of the drive output shaft of the tractor power take-off is reversed in response to the providing of the reverse control signals in the tractor controller in a second mode of operation, thereby, rotating the working tool of the first functional element in a second direction which is opposite to the first direction.

According to another aspect, an agricultural system is provided. The agricultural system comprises a tractor; an implement attached to the tractor; a driveline between a driving device of a tractor and a first functional element of an implement operatively attached to the tractor, the driveline comprising a tractor driveline and an implement driveline connected through a power take-off connection connecting an drive output shaft of a tractor power take-off provided in the tractor driveline and a drive input shaft of the implement driveline; and a tractor-implement control system. The tractor-implement control system is arranged to: provide a driving force to the first functional element of the implement through the driveline in a first mode of operation, thereby, a working tool rotatable received in the first functional implement rotating in a first direction in response to the driving force; detect an operation problem for the first functional element by a sensor provided in a tractor-implement control system configured to provide one or more control functions for both the tractor and the implement; provide reverse control signals in a tractor controller provided in the tractor-implement control system in response to the detecting of the operation problem for the first functional element; and revers a direction of rotation of the drive output shaft of the tractor power take-off in response to the providing of the reverse control signals in the tractor controller in a second mode of operation, thereby, rotating the working tool of the first functional element in a second direction which is opposite to the first direction.

The sensor may be monitoring operation of the functional element continuously or discontinuously. Starting and/or stopping a monitoring time period may be triggered by the user of the tractor. For example, a user input causing the start and/or the stop of the monitoring may be received in the tractor-implement control system. As an alternative, after a monitoring was started in response to a user input, he monitoring period may be stopped after a predetermined or predefined time period automatically without receiving another user input.

The tractor may be provided with tractor control network comprising the tractor controller. The implement may be provided with an implement control network comprising the implement controller. The control networks may be connected through a data bus. Attaching the implement to the tractor may comprise connecting a connector comprised of a plug (male-ended) and a jack (female-ended). One or more power supply lines and one or more signal lines which may also be referred to as data communication lines may be provided with the data bus.

By the data or control bus and the components connected to it, an electronic tractor-implement control system of the agricultural system may be provided with a network infrastructure for transmitting data between components. Electronic control units coupled to the data bus may be assigned to one or more functional elements of the agricultural machine. Due to the functional assignment the electronic control unit is configured to provide control signals to the functional element (working unit) for operating the functional element. The electronic control unit may be configured to receive operation signals from the function element which characterize the operation of the functional element. The tractor controller may be connected to a plurality of electronic control units in turn assigned to functional elements or components of the tractor.

In the tractor-implement control system, for data processing a processor connected to a memory element may be provided. The processor may be provided in a user terminal or outside of the user terminal, but functionally connected to an input device of the user terminal. The user terminal sometimes is referred to as virtual terminal of the electronic control system of the agricultural system. The user terminal may be configured to provide user access to normal or standard control functions with respect to functional components of the agricultural system, e.g. the functional or working components the implement.

The terminal display may be provided with an input device, e.g. a touch sensitive device and/or a mouse device. Through the user terminal and/or the additional user terminal, a user configuration input may be received Data or signal communication between some or all components of the agricultural system control network may be done at least in part by wireless communication. Wireless data communication may be combined with wired communication.

The tractor power take-off (PTO) may comprise at least one of a rear PTO and a front PTO provided at the rear side and the front side of the tractor, respectively.

The method may further comprise providing the driving force to a second functional element of the implement through the driveline in the first mode of operation; providing disconnect control signals in an implement controller provided in the tractor-implement control system in response to the detecting of the operation problem for the first functional element; and preventing the driving force from being provided to the second functional element in the second mode of operation. The second functional element may be provided with a working tool rotatable received in the second functional element. In response to receiving the driving force in the second functional element, the working tool may be rotated in operation. As an alternative, the working tool may perform some other kind of movement driven by the driving force received in the second functional element of the implement. For example, the working tool may be advanced along a line in response to the driving force being applied.

The preventing may further comprises operating a clutch for disconnecting the second functional element from the reversely rotating of the drive output shaft of the tractor power take-off in the second direction. A clutch system may be provided which is controlled in response to detecting the operation problem for the first functional element. A plurality of functional elements may be disconnected and reconnected by the clutch system.

The method may be further comprising providing additional control signals in the implement controller in response to the detecting of the operation problem for the first functional element; changing an operation parameter applied to the first functional element in the first mode of operation in response to providing the additional control signals; and applying the changed operation parameter to the operation of the first functional element. The additional control signals are configured to support repair of the operation problem and are provided in addition to the reverse control signals. For example, by the sensor a blockage of a feeding channel of the implement may be detected. Such feeding channel, for example, may be provided in a bale forming apparatus. Along the feeding channel crop picked up may be provided to a chamber of the implement, for example, a bale forming chamber of the baling apparatus. The baling or bale forming apparatus may be provided with one or more bale forming chambers. If a blockage in the feeding channel is detected, reversing of the working tool conveying the crop through the feeding channel may need to be rotated in the reversed direction. In addition, in response to the additional control signals some additional operation parameter with regard to the feeding channel may be changed for overcoming the detected operation problem. For example, the additional control signals may cause expansion of the feeding channel for overcoming the blockage. In an embodiment, a drop floor component of the feeding channel may be lowered in response to the additional control signals, thereby, expanding the size of the feeding channel. After the blockage is overcome, the drop floor component may be moved back into the original position. With regard to other agricultural machines, different components may be controlled accordingly by the additional control signals.

The method may further comprise at least one of providing the reverse control signals in a common system controller provided in the tractor-implement control system and comprising the tractor controller and the implement controller, the common system controller being connected to both one or more electronic control units of the implement, and one or more electronic control units of the tractor through a data bus; and providing the disconnect control signals in the common system controller. The common system controller may be provided as an integrated controller in the control network structure of the agricultural machine.

The method may be further comprising rotating the drive output shaft of the tractor power take-off with a first mode rotation speed in the first mode of operation; and rotating the drive output shaft with a second mode rotation speed which different from the first mode rotation speed in the second mode of operation. The second mode rotation speed may be lower than the first mode rotation speed. As an alternative, the second mode rotation speed may be higher than the first mode rotation speed. As an option, the first and second mode rotation speed may be not differing.

The method may further comprise rotating the drive input shaft of the implement driveline with a first rotation speed in the first mode of operation; and rotating the drive input shaft with a second rotation speed which different from the first rotation speed in the second mode of operation. In the first mode of operation the drive input shaft may be driven with a higher rotation speed leading to a first rotation speed being higher than the second rotation speed. As an alternative, the second rotation speed may be higher than the first rotation speed.

The method may comprise rotating the working tool with a first tool rotation speed in the first mode of operation; and rotating the working tool with a second tool rotation speed which different from the first rotation speed in the second mode of operation, the working tool being rotated in a reversed direction in the second mode of operation. The working tool of the first functional element or component may be rotated with a lower rotation speed in the second mode of operation. Therefore, the first tool rotation speed is higher than the second tool rotation speed. As an alternative, rotating of the working tool may be performed with a higher rotation speed in the second mode of operation.

The detecting of the operation problem may further comprise monitoring by the sensor at least one function for the first functional element selected from the following group: movement of the working tool, speed of movement of the working tool, rotation of the working tool, speed of rotation of the working tool, and pressure force acting on the working tool. The sensor may be arranged to monitor in general one or more operation parameters for the first functional element. Specifically, one or more operation parameters with regard to the working tool of the first functional element may be monitored by the sensor. In addition or as an alternative, one or more operation parameters may be monitored for one or more other components of the first functional element different from the working tool by the sensor. For example, a position of the drop floor of the feeding channel of the baling apparatus may be monitored. In an alternative embodiment, a door or cover element of the implement may be monitored by the sensor. Sensor signals generated in the sensor and indicating the detection of the one or more operation parameters may be sent from the sensor to the implement controller or the common system controller through an electronic control unit (ECU) assigned to the sensor. Transmission of such sensor signals may be triggered on the side of the sensor by detecting the operation problem. While no operation problem is detected, transmission of sensor signals to the controller may be prevented or interrupted.

The providing of the reverse control signals may further comprise providing of the reverse control signals in the tractor controller in response to a user input received through a user input device connected to the tractor-implement control system. The information about the detecting of the operation problem may be provided to the user through the output device, for example, a display provided in the tractor. In addition or as an alternative, some acoustic signal may be outputted to the user in response to detecting the operation problem. The user input received in a tractor controller may be confirming that reversing the direction of rotation of the drive output shaft of the tractor power take-off can be started. The user input may be determining parameters of the reversing of the direction, for example, a rotation speed to be applied in the second mode of operation and/or a time period for the reversing. After the time period, the drive output shaft of the tractor may automatically be driven in the first direction again.

The method may further comprise providing re-reverse control signals in the tractor controller; and re-reversing the direction of rotation of the drive output shaft of the tractor power take-off in response to the providing of the re-reverse control signals in the tractor controller in a third mode of operation, thereby, rotating the working tool of the first functional element in the first direction. Re-reversing of the direction of rotation of the drive output shaft of the tractor power take-off may be started in response to receiving a user input through the input device connected to the tractor controller. The user input received may determine a fixed time for starting re-reversing of the direction of rotation of the drive output shaft.

The method may still further comprise detecting an end-of-operation problem for the functional element by the sensor. For example, the sensor may detect that the blockage of the feeding channel has ended. With regard to detecting the end of operation problem, the embodiments described with regard to detecting the operation problem may apply mutatis mutandis.

The providing the reverse control signals may further comprise determining characteristics of the operation problem detected, and generating the reverse control signals in dependence on the characteristics of the operation problem. For example, in case of determining, for the operation problem, first characteristics first reverse control signals may be provided, while in case of determining, for the operation problem, second characteristics which are different from the first characteristics second reverse control signals may be provided, the second reverse control signals being different from the first reverse control signals. For example, the first and second reverse control signals may refer to different (reverse) rotation speed. As an alternative or in addition, the reverse control signals may provide for applying continuous or interval reverse rotation depending on the characteristics determined for the operation problem. In an alternative embodiment, the control signals received in the tractor control network may be analyzed by the tractor control network for determining, for example, a type or kind of operation problem. The reverse control signals may be generated in dependence on the type or kind of operation problem determined. For example, a speed of the reverse rotation of the drive output shaft of the tractor power take-off may be different for differing operation problems. If, for example, for the working tool of the functional element some blockage is detected, a lower reverse rotation speed may be applied compared to a situation in which there is no (complete) blockage, but the rotation speed of the working tool in the normal (non-reversed) direction has been forced lower because of heavy load.

The connecting of the tractor control network and the implement control network through the data bus may further comprise establishing an ISOBUS connection between the tractor control network and the implement control network. The ISOBUS standard may implement one or more parts of the 11783 standard.

With regard to the agricultural system the alternative embodiments disclosed above may apply mutatis mutandis.

DESCRIPTION OF FURTHER EMBODIMENTS

Figure 2:
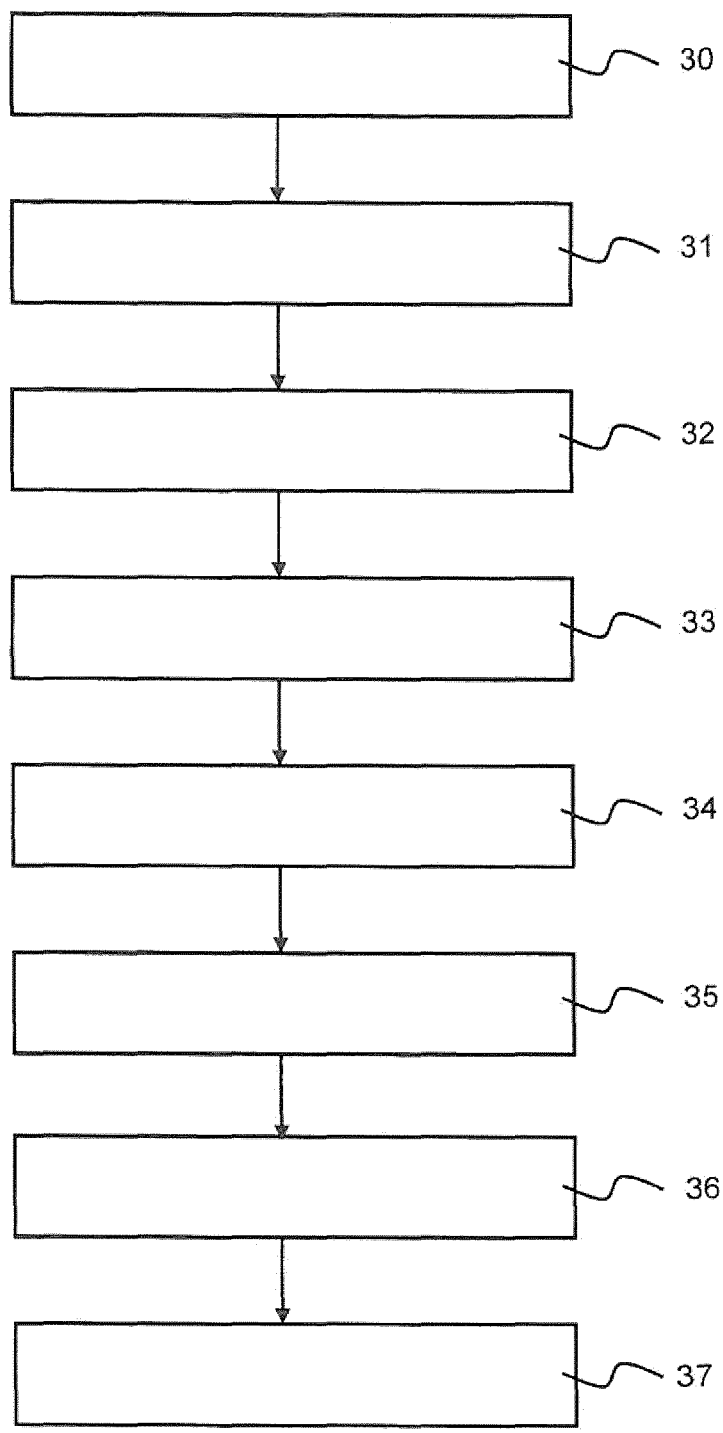

Following, further embodiments are described, by way of example, with reference to figures. In the drawings show:

FIG. 1 a schematic representation of an agricultural system comprising a tractor and an implemented connected to the tractor, and FIG. 2 a schematic representation of a block diagram with regard to a method of operating the agricultural system depicted in FIG. 1.

FIG. 1 shows a schematic representation of an agricultural system having a tractor 1 and an implement 2 connected to the tractor 1.

An agricultural system control network 3 provides for an electronic control system of the agricultural system. The agricultural system control network 3 comprises a tractor control network 4 and an implement control network 5. The agricultural system control network 3 is having a data bus 6 to which a user terminal 7, a task controller 8, and a plurality of electronic control units 9.1, . . . , 9.3 provided on the tractor 1 and a plurality of electronic control units 10.1, 10.3 provided on the implement 2 are connected. Each of the electronic control units 9.1, . . . , 9.3; 10.1, . . . , 10.3 is assigned to a functional element 11.1, . . . , 11.3 and 12.1, . . . , 12.3 provided in the tractor 1 and the implement 2, respectively. With regard to the implement 2, the functional elements 12.1, . . . , 12.3 may also be to as working or functional unit.

The functional element 11.3 provided in the tractor 1 is a driving unit providing a driving force to a tractor power take-off 13 which is connected to the driving unit through a tractor driveline 14. With regard to the tractor power take-off 13, a drive output shaft 15 of the tractor 1 is connected to a drive input shaft 16 of an implement driveline 17. The implement driveline 17 is transmitting the driving force to the functional element 12.3 for driving a working tool 18 of the functional element 12.3. Operation of the functional element 12.3 is controlled by the electronic control unit 10.3 of the implement 2.

A sensor 19 is provided for monitoring operation of the functional element 12.3, e.g. operation of the working tool 18. The sensor, according to the embodiment in FIG. 1, is connected to the electronic control unit 10.3 for transmitting sensor signals.

Through the data bus 6 electronic data may be transmitted between the components, units, modules or elements connected to the data bus 6. The electronic control system of the agricultural system control network 3 may implement one or more parts of the ISO 11783 standard.

The data bus 6 is provided with a plug connector 20 connecting the tractor control network 4 and the implement control network 5.

The user or operator terminal 7 is provided with a terminal display 21 and provides for user control and user display. Further, the user terminal 7 is provided with a processor unit comprising a processor and a memory element connected to the processor. Multiple software applications implemented on the user terminal may be running simultaneously.

Through the user terminal 7 user input may be received for controlling the functional elements 11.1, . . . , 11.3 and 12.1, . . . , 12.3 of the agricultural machine or system. Also, through the terminal display 21 operation information may be displayed to the user.

FIG. 2 shows a schematic representation of a block diagram with regard to a method of operating the agricultural system depicted in FIG. 1. In step 30 the tractor 1 is connected or attached the implement 2. For attaching the tractor driveline 14 and the implement driveline 17 are connected through the tractor power take-off 13.

Following, in step 31 the tractor control network 4 and the implement control network 5 are connected through the plug connector 20. Thereby, both the tractor control network 4 and the implement control network 5 are connected to the data bus 6. The data bus 6 comprises at least a signal line for transmitting control or data signals between the tractor control network 4 and the implement control network 5, and a driving power supply line for providing a plurality of different driving voltages from a tractor power supply 22 which may comprise a battery to the working or functional elements 12.1, 12.3 of the implement 2.

Control signals are transmitted over the signal line of the data bus 6 between the tractor control network 4 and the implement control network 5 (step 32).

In step 33, by the sensor 19 an operation problem is detected for the functional element 12.3. For example, a rotation of the working tool 18 of the functional element 12.3 may have stopped because of some blockage. As an alternative, a pressure exceeding a threshold pressure may be acting on the working tool 18.

From the sensor 19 sensor signals are transmitted to the electronic control unit 10.3. In response to receiving sensor signals indicating the operation problem, control signals generated in the electronic control unit 10.3 are transmitted to the tractor control network 4 through the data bus 6, the control signals indicating detection of the operation problem for the functional element 12.3 (step 34). As an alternative of or in addition to indicating the operation problem, the control signals may comprise a request for reversing the direction of rotation. In response to receiving the control signals, in the tractor control network 4 reverse control signals are generated in step 35.

Optionally, the control signals received in the tractor control network 4 may be analyzed by the tractor control network 4 for determining, for example, a type or kind of operation problem. The reverse control signals may be generated in dependence on the type or kind of operation problem determined. For example, a speed of the reverse rotation of the drive output shaft 15 of the tractor power take-off 13 may be different for differing operation problems. If, for example, for the working tool 18 of the functional element 12.3 some blockage is detected, a lower reverse rotation speed may be applied compared to a situation in which there is no (complete) blockage, but the rotation speed of the working tool 18 in the normal (non-reversed) direction has been forced lower because of heavy load.

The direction of rotation of the drive output shaft 15 of the tractor power take-off 13 is reversed in response to the reverse control signals in step 36. The drive output shaft 15 of the tractor power take-off 13 is rotated in a second direction, thereby, rotating the working tool 18 of the functional element 12.3 in a second direction which is opposite to the first direction. After the operation problem has been solved, according to step 37, the direction of rotation of the working tool 18 is re-reversed.

The features disclosed in this specification, the figures and/or the claims may be material for the realization of the invention in its various embodiments, taken in isolation or in various combinations thereof.

The invention claimed is:

1. A method of operating an agricultural system having a tractor and an implement, the method comprising:
providing a driveline between a driving device of a tractor and a first functional element of an implement operatively attached to the tractor, the driveline comprising a tractor driveline and an implement driveline connected through a power take-off connection connecting a drive output shaft of the tractor power take-off and a drive input shaft of the implement driveline;
providing a driving force to the first functional element of the implement through the driveline in a first mode of operation, thereby, a working tool rotatable received in the first functional implement rotating in a first direction in response to the driving force;

detecting an operation problem for the first functional element by a sensor provided in a tractor-implement control system configured to provide one or more control functions for both the tractor and the implement;

providing reverse control signals in a tractor controller provided in the tractor-implement control system in response to the detecting of the operation problem for the first functional element; and reversing a direction of rotation of the drive output shaft of the tractor power take-off in response to the providing of the reverse control signals in the tractor controller in a second mode of operation, thereby, rotating the working tool of the first functional element in a second direction which is opposite to the first direction.

2. The method according to claim 1, further comprising:
providing the driving force to a second functional element of the implement through the driveline in the first mode of operation;
providing disconnect control signals in an implement controller provided in the tractor-implement control system in response to the detecting of the operation problem for the first functional element; and
preventing the driving force from being provided to the second functional element in the second mode of operation.

3. The method according to claim 2, wherein the preventing further comprises operating a clutch for disconnecting the second functional element from the reversely rotating of the drive output shaft of the tractor power take-off in the second direction.

4. The method according to claim 1, further comprising:
providing additional control signals in the implement controller in response to the detecting of the operation problem for the first functional element;
changing an operation parameter applied to the first functional element in the first mode of operation in response to providing the additional control signals; and
applying the changed operation parameter to the operation of the first functional element.

5. The method according to claim 1, further comprising at least one of:
providing the reverse control signals in a common system controller provided in the tractor-implement control system and comprising the tractor controller and the implement controller, the common system controller being connected to both one or more electronic control units of the implement, and one or more electronic control units of the tractor through a data bus; and
providing the disconnect control signals in the common system controller.

6. The method according to claim 1, further comprising:
rotating the drive output shaft of the tractor power take-off with a first mode rotation speed in the first mode of operation; and
rotating the drive output shaft with a second mode rotation speed which different from the first mode rotation speed in the second mode of operation.

7. The method according to claim 1, further comprising:
rotating the drive input shaft of the implement driveline with a first rotation speed in the first mode of operation; and
rotating the drive input shaft with a second rotation speed which different from the first rotation speed in the second mode of operation.

8. The method according to claim 1, further comprising:
rotating the working tool with a first tool rotation speed in the first mode of operation; and
rotating the working tool with a second tool rotation speed which different from the first rotation speed in the second mode of operation, the working tool being rotated in a reversed direction in the second mode of operation.

9. The method according to claim 1, wherein the detecting of the operation problem further comprises monitoring by the sensor at least one function for the first functional element that is selected from the following group: movement of the working tool, speed of movement of the working tool, rotation of the working tool, speed of rotation of the working tool, and pressure force acting on the working tool.

10. The method claim 1, wherein the providing of the reverse control signals further comprises providing of the reverse control signals in the tractor controller in response to a user input received through an user input device connected to the tractor-implement control system.

11. The method according to claim 1, further comprising:
providing re-reverse control signals in the tractor controller; and
re-reversing the direction of rotation of the drive output shaft of the tractor power take-off in response to the providing of the re-reverse control signals in the tractor controller in a third mode of operation, thereby, rotating the working tool of the first functional element in the first direction.

12. The method according to claim 10, further comprising detecting an end-of-operation problem for the first functional element by the sensor.

13. The method according to claim 1, the providing the reverse control signals comprising:
determining characteristics of the operation problem detected; and
generating the reverse control signals in dependence on the characteristics of the operation problem.

14. An agricultural system, comprising:
a tractor;
an implement attached to the tractor;
a driveline between a driving device of a tractor and a first functional element of in implement operatively attached to the tractor, the driveline comprising a tractor driveline and an implement driveline connected through a power take-off connection connecting an drive output shaft and a drive input shaft of the implement driveline; and
a tractor-implement control system;
wherein the tractor-implement control system is arranged to:
provide a driving force to the first functional element of the implement through the driveline in a first mode of operation, thereby, a working tool rotatable received in the first functional implement rotating in a first direction in response to the driving force;
detect an operation problem for the first functional element by a sensor provided in a tractor-implement control system configured to provide one or more control functions for both the tractor and the implement;
provide reverse control signals in a tractor controller provided in the tractor-implement control system in response to the detecting of the operation problem for the first functional element; and reverse a direction of rotation of the drive output shaft of the tractor power take-off in response to the providing of the reverse control signals in the tractor controller in a second mode of operation, thereby, rotating the working tool of the first functional element in a second direction which is opposite to the first direction.

* * * * *